US007753543B2

(12) United States Patent
Hsu et al.

(10) Patent No.: US 7,753,543 B2
(45) Date of Patent: Jul. 13, 2010

(54) PRISM SHEET AND BACKLIGHT MODULE USING THE SAME

(75) Inventors: Tung-Ming Hsu, Taipei Hsien (TW); Shao-Han Chang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 238 days.

(21) Appl. No.: 11/957,492

(22) Filed: Dec. 17, 2007

(65) Prior Publication Data

US 2009/0073676 A1 Mar. 19, 2009

(30) Foreign Application Priority Data

Sep. 17, 2007 (CN) .................. 2007 1 0201746

(51) Int. Cl.
*G09F 13/04* (2006.01)
(52) U.S. Cl. .................. 362/97.1; 362/626; 362/620
(58) Field of Classification Search ....... 362/97.1–97.4, 362/626, 620
See application file for complete search history.

(56) References Cited

U.S. PATENT DOCUMENTS

| 5,838,403 | A | * | 11/1998 | Jannson et al. | ................. 349/65 |
| 6,836,303 | B2 | * | 12/2004 | Kim | ............................ 349/65 |
| 7,252,428 | B2 | | 8/2007 | Lee et al. | |
| 7,320,538 | B2 | * | 1/2008 | Ko et al. | ...................... 362/606 |
| 7,334,920 | B2 | | 2/2008 | Chang | |
| 7,391,571 | B2 | * | 6/2008 | Lee et al. | ..................... 359/619 |
| 7,535,642 | B2 | | 5/2009 | Toshima et al. | |
| 2005/0099815 | A1 | | 5/2005 | Kim et al. | |
| 2006/0039073 | A1 | * | 2/2006 | Lee et al. | ..................... 359/599 |
| 2006/0256582 | A1 | * | 11/2006 | Chuang | ...................... 362/620 |
| 2006/0279963 | A1 | * | 12/2006 | Kim et al. | .................... 362/619 |
| 2007/0171671 | A1 | * | 7/2007 | Kurokawa et al. | .......... 362/606 |

FOREIGN PATENT DOCUMENTS

| CN | 1614471 A | 5/2005 |
| CN | 1716027 A | 1/2006 |
| CN | 101025516 A | 8/2007 |
| CN | 100472242 C | 3/2009 |
| CN | 100547462 C | 10/2009 |

* cited by examiner

*Primary Examiner*—Sandra L O'Shea
*Assistant Examiner*—Evan Dzierzynski
(74) *Attorney, Agent, or Firm*—Frank R. Niranjan

(57) ABSTRACT

An exemplary prism sheet includes a transparent main body. The main body includes a first surface and a second surface. The first surface and the second surface are on opposite sides of the main body. The first surface and the second surface define a plurality of first micro-depressions and a plurality of second micro-depressions respectively. Each first micro-depression is defined by four connecting curved inner sidewalls. A transverse width of each curved inner sidewall of each first micro-depression progressively decreases with increasing distance from the first surface. Each second micro-depression is defined by four connecting inner sidewalls. A transverse width of each inner sidewall of each second micro-depression progressively decreases with increasing distance from the second surface. A backlight module using the present prism sheet is also provided.

18 Claims, 9 Drawing Sheets

PRISM SHEET AND BACKLIGHT MODULE USING THE SAME

CROSS-REFERENCE TO RELATED APPLICATIONS

This application is related to nine co-pending U.S. patent applications, which are: applications Ser. Nos. 11/938,307 and 11/938,308, filed on Nov. 12, 2007, and both entitled "PRISM SHEET AND BACKLIGHT MODULE USING THE SAME"; application Ser. No. 11/940,328, filed on Nov. 15, 2007, and entitled "PRISM SHEET AND BACKLIGHT MODULE USING THE SAME", application Ser. Nos. 11/946,866 and 11/946,867, filed on Nov. 12, 2007, and both entitled "PRISM SHEET AND BACKLIGHT MODULE USING THE SAME", application Ser. Nos. 11/949,058, 11/949,059 and 11/949,060, filed on Dec. 3, 2007, and both entitled "PRISM SHEET AND BACKLIGHT MODULE USING THE SAME", and application Ser. No. 11/957,493, filed on Dec. 17, 2007, entitled "PRISM SHEET AND BACKLIGHT MODULE USING THE SAME". In all the co-pending applications, the inventors are Tung-Ming Hsu and Shao-Han Chang. The co-pending applications have the same assignee as the present application. The disclosure of the above identified application is incorporated herein by reference.

BACKGROUND OF THE INVENTION

1. Field of the Invention

The present invention relates to prism sheets, and particularly, to a prism sheet used in a backlight module.

2. Discussion of the Related Art

In a liquid crystal display device (LCD device), liquid crystal is a substance that does not illuminate light by itself. Instead, the liquid crystal relies on light received from a light source to display information. In the case of a typical liquid crystal display device, a backlight module powered by electricity supplies the needed light.

FIG. 7 depicts a typical direct type backlight module 100. The backlight module 100 includes a housing 11, a plurality of lamps 12 disposed above a base of the housing 11, a light diffusion plate 13 and a prism sheet 10 stacked on top of the housing 11 in that order. Inner walls of the housing 11 are configured for reflecting light upwards. The light diffusion plate 13 includes a plurality of dispersion particles (not shown) therein. The dispersion particles are configured for scattering light, thus enhancing the uniformity of light exiting the light diffusion plate 13.

Referring to FIG. 8, the prism sheet 10 includes a base layer 101 and a prism layer 103 formed on the base layer 101. The prism layer 103 contains a plurality of parallel prism lenses 105 having a triangular cross section. The prism lenses 105 are configured for collimating light to a certain extent. Typically, a method of manufacturing the prism sheet 10 includes the following steps: first, a melted ultraviolet (UV)-cured transparent resin is coated on the base layer 101, then the melted ultraviolet-cured transparent resin is solidified into the prism lenses 105.

In use, unscattered light from the lamps 12 enters the light diffusion plate 13 and becomes scattered. The scattered light leaves the light diffusion plate 13 and enters the prism sheet 10. The scattered light then travels through the prism sheet 10 before refracting out at the prism lenses 105 of the prism sheet 10. Thus, refracted light that leaves the prism sheet 10 is concentrated at the prism layer 103 and increases the brightness (illumination) of the prism sheet 10. The refracted light then propagates into an LCD panel (not shown) disposed above the prism sheet 10.

When the light is scattered in the light diffusion plate 13, scattered light enters the prism sheet at different angles of incidence. Referring to FIG. 9, when scattered light enters the prism sheet 10 at different angles of incidence, the scattered light generally travels through the prism sheet 10 along three light paths. In the first light path (such as $a_1$, $a_2$) the light enters the prism sheet at small angles of incidence and refracts out of the prism lenses with the refracted path closer to the normal to the surface of the base layer. In the second light path (such as $a_3$, $a_4$) the light enters the prism sheet 10 at angles of incidence larger than the first light path and refracts out of the prism lenses 105 with the refracted path being closer to the normal to the surface of the prism lenses 105. Both the first light path and the second light path contribute to the brightness of the LED and the light utilization efficiency of the backlight module 100. However, in the case of the third light path (such as $a_5$, $a_6$), the light enters the prism sheets at angles greater than the second light path, such that when the refracted light in the third light path leaves the prism sheet 10 at the prism lenses 105, the refracted light impinges on the surface of adjacent prism lens 105 and reenters the prism sheet 10. Thus, light traveling along the third light path will eventually reenter the prism sheet 10 and may exit the prism sheet 10 on the same side the light entered. This third light path does not contribute to the light utilization efficiency of the backlight module 100. Further, the third light path may interfere with or inhibit other incident light resulting in decreasing brightness of the backlight module 100.

What is needed, therefore, is a new prism sheet and a backlight module using the prism sheet that can overcome the above-mentioned shortcomings.

SUMMARY

In one aspect, a prism sheet according to a preferred embodiment includes a transparent main body. The main body includes a first surface and a second surface. The first surface and the second surface are on opposite sides of the main body. The first surface and the second surface define a plurality of first micro-depressions and a plurality of second micro-depressions respectively. Each first micro-depression is defined by four connecting curved inner sidewalls. A transverse width of each curved inner sidewall of each first micro-depression progressively decreases with increasing distance from the first surface. Each second micro-depression is defined by four connecting curved inner sidewalls. A transverse width of each inner sidewall of each second micro-depression progressively decreases with increasing distance from the second surface.

In another aspect, a backlight module according to a preferred embodiment includes a plurality of lamps, a light diffusion plate and a prism sheet. The light diffusion plate is disposed above the lamps and the prism sheet is stacked on the light diffusion plate. The prism sheet is same as described in a previous paragraph.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present prism sheet and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present prism sheet and backlight module, in detail.

Figure 1:
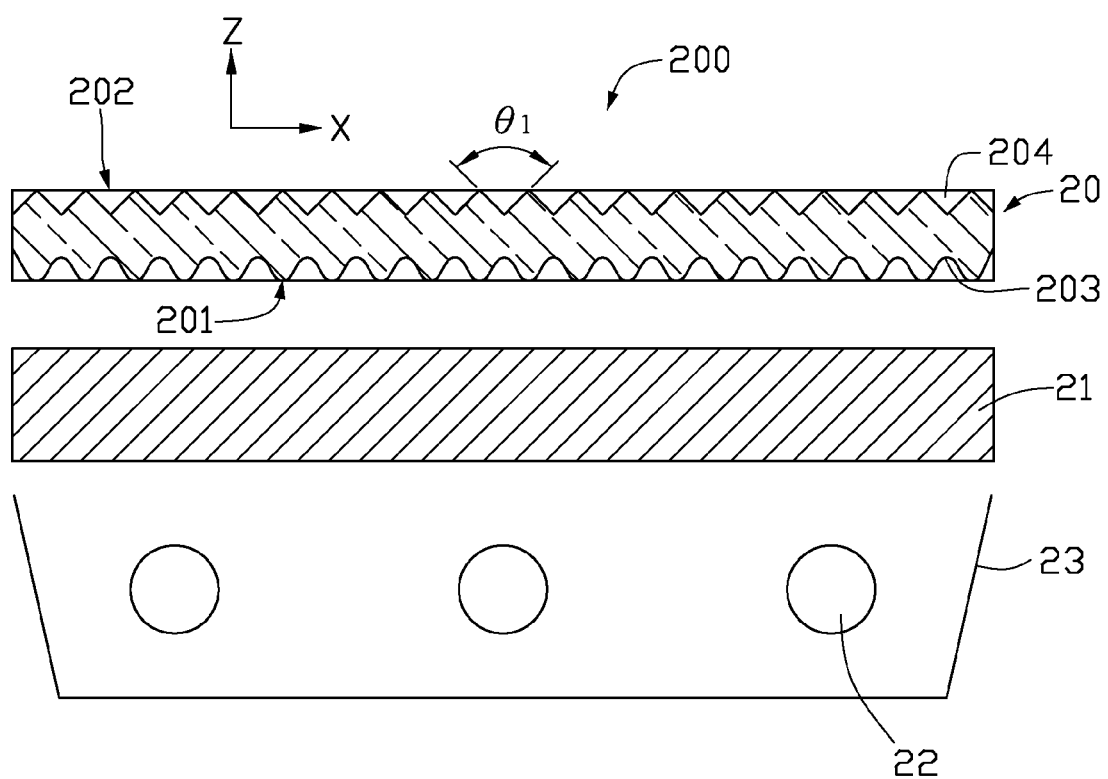
FIG. 1 is a side, cross-sectional view of a backlight module using a prism sheet according to a first preferred embodiment of the present invention.

Referring to FIG. 1, a backlight module 200 in accordance with a first preferred embodiment of the present invention is shown. The backlight module 200 includes a prism sheet 20, a light diffusion plate 21, a plurality of lamps 22, and a housing 23. The lamps 22 are regularly aligned above a base of the housing 23. The light diffusion plate 21 and the prism sheet 20 are stacked on the top of the housing 23 in that order.

Figure 2:
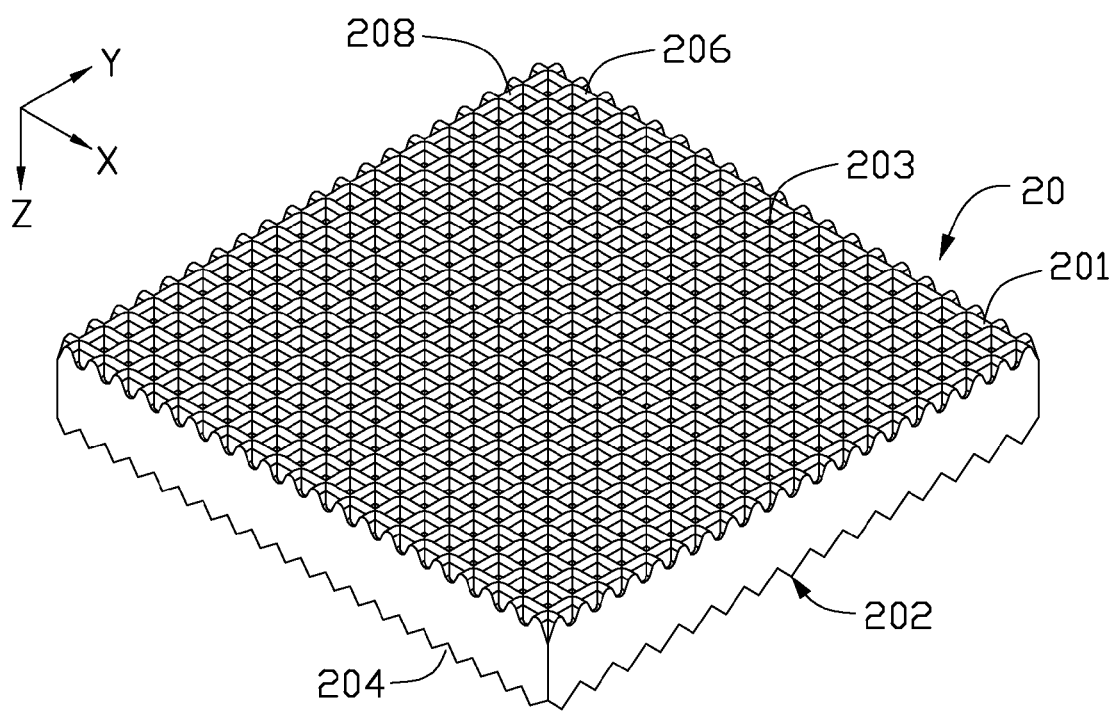
FIG. 2 is an isometric view of the prism sheet of FIG. 1.
Figure 3:
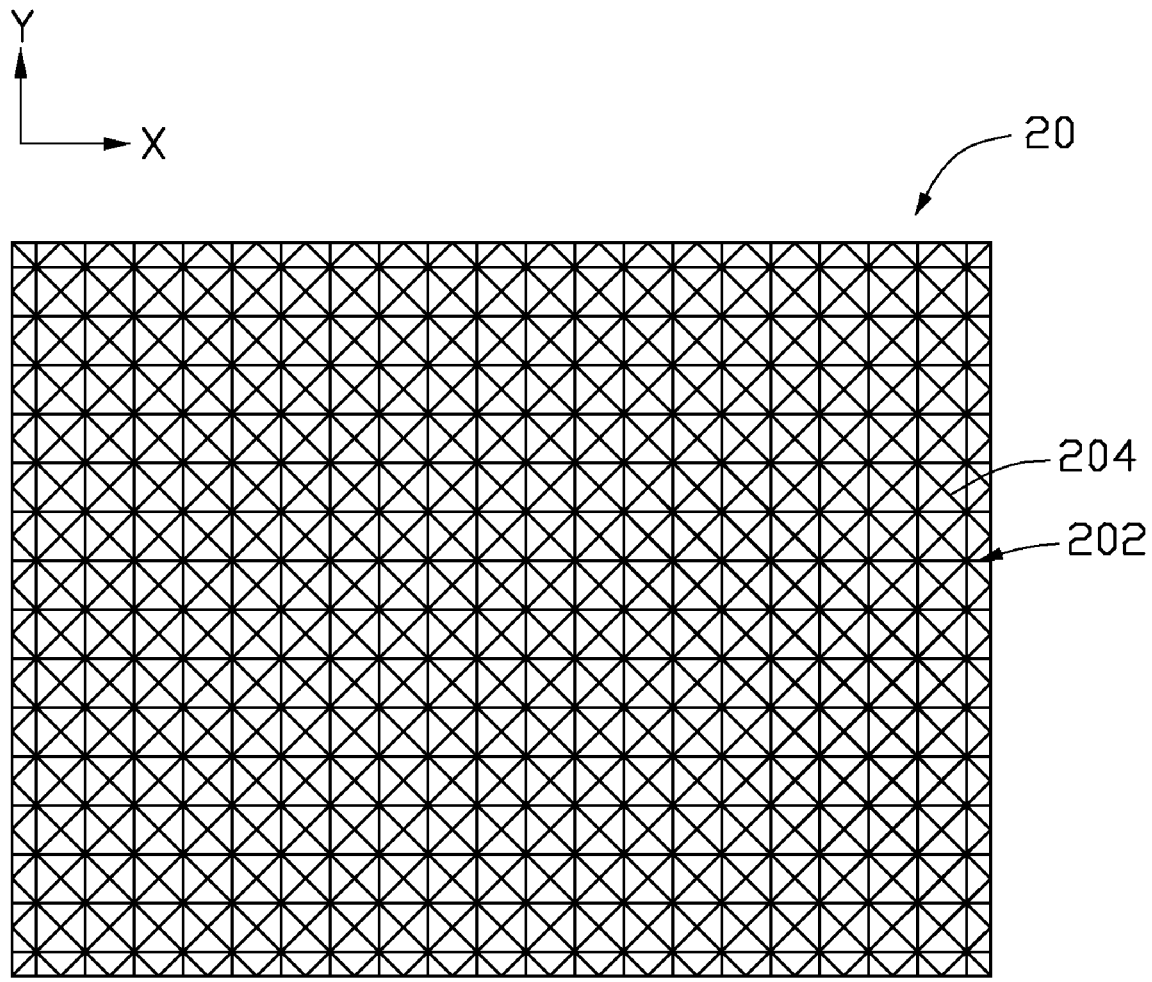
FIG. 3 is a top plan view of the prism sheet of FIG. 1.

Referring to FIGS. 2 and 3, the prism sheet 20 includes a transparent main body. The main body includes a first surface 201 and a second surface 202. The first surface 201 and the second surface 202 are on opposite sides of the main body. Furthermore, the first surface 201 and the second surface 202 define a plurality of first micro-depressions 203 and a plurality of second micro-depressions 204 respectively. The prism sheet 20 is stacked on the light diffusion plate 21 in a way such that the first surface 201 is adjacent to the light diffusion plate 21, and the second surface 202 faces away from the light diffusion plate 21.

The rows and columns of the first micro-depressions 203 in the matrix are parallel to the edges of the prism sheet 20 (along an X-direction or a Y-direction) correspondingly. Each of the micro-depressions 203 is defined by four connecting curved inner sidewalls. A transverse width of each curved inner sidewall progressively decreases with increasing distance from the first surface 201. A plurality of first waved ridges 206 formed by adjacent first micro-depressions 203 along the X-direction intersect with a plurality of second waved ridges 208 formed by the adjacent first micro-depressions 203 along the Y-direction.

In the first embodiment, a pitch between adjacent first micro-depressions 203 along the X-axis direction or the Y-axis direction is configured to be in the range from about 0.025 millimeters to about 1.5 millimeters. An outline of a cross-section of each micro-depression 203 taken along a plane perpendicular to the first surface 201 is a sinusoidal curve or a parabola. The first micro-depressions 203 are configured for enabling the first surface 201 to converge incident light from the lamps 22 to a certain extent (hereafter first light convergence).

Each second micro-depression 204 has a shape like an inverted prism and is enclosed by four triangular inner sidewalls connected to each other. In the first preferred embodiment, each second micro-depression 204 is a square pyramidal depression forming four triangular inner sidewalls. Each of the triangular inner sidewalls has an isosceles triangle shape. A transverse width of each triangular inner sidewall progressively decreases with increasing distance from the second surface 202. The second micro-depressions 204 are configured for converging incident light to a first degree from the lamps 22 to a certain extent.

The second micro-depressions 204 are formed in the prism sheet 20 according to a first matrix manner. Rows and columns of the second micro-depressions 204 in the matrix are parallel to the edges of the prism sheet 20 (along an X-axis and a Y-axis direction) correspondingly. A pitch between adjacent second micro-depressions 204 along the X-axis direction or the Y-axis direction is configured to be in the range from about 0.025 millimeters to about 1 millimeter. Again referring to FIG. 1, an angle $\theta_1$ formed by sidewalls on opposite sides of each second micro-depression 204 is configured to be in the range from about 60 degrees to about 120 degrees. The second micro-depressions 204 are configured for enabling the second surface 202 to converge light exiting the second surface 202 (hereafter second light convergence). In the alternative embodiment, rows or columns, of the first micro-depressions 203 and the second micro-depressions 204, may be obliquely aligned to the sides of the prism sheet correspondingly, thus having other alignments or orientations.

A thickness of the prism sheet 20 is preferably in the range from about 0.5 millimeters to about 3 millimeters. The prism sheet 20 can be made of transparent material selected from the group consisting of polycarbonate (PC), polymethyl methacrylate (PMMA), polystyrene (PS), copolymer of methylmethacrylate and styrene (MS), and any suitable combination thereof.

Again referring to FIG. 1, the lamps 22 can be point light sources such as light emitting diodes or linear light sources such as cold cathode fluorescent lamps. Even though the housing 23 is made of high reflectivity material, additionally, an extra coating can be further applied on the interior. In this embodiment, the lamps 22 are cold cathode fluorescent lamps. The housing 23 is made of high reflective metal.

In the backlight module 200, when light enters the prism sheet 20 via the first surface 201, the light undergoes the first light convergence at the first surface 201. Then the light further undergoes a light convergence to a second degree at the second surface 202 before exiting the prism sheet 20. Thus, a brightness of the backlight module 200 is increased. In addition, due to the first micro-depressions 203, the light exiting the prism sheet 20 would mostly propagate along directions substantially parallel to the Z-direction. At the same time, few or less of the light would travel along directions parallel to the X-direction, minimizing the light energy loss. Thus, the light energy utilization rate of the backlight module 200 is high.

Furthermore, because the first and second surfaces 201, 202 form depressions having sidewalls expanding out of the prism sheet 20 at an angle, the light receiving area of the sheet is increased and the angles that the light refracts out (allowing the light to exit) of the prism sheet 20 is expanded. Additionally, the slope of the sidewalls of micro-depressions 203 and also the obliqueness relative to edges of the prism sheet 20 can have various configurations according to predetermined viewing angles requirements of the backlight module 200. The prism sheet 20 can also be orientated to satisfy horizontal and vertical viewing angles of most LCD displays' requirements.

When compared with the conventional prism sheet, the prism sheet 20 is easier to mass produce because the prism lenses of the conventional prism sheet is manufactured by solidifying melted ultraviolet-cured transparent resin whereas the prism sheet 20 is manufactured by injection molding. The prism lenses made by ultraviolet-cured transparent resin are usually damaged or scratched due to poor rigidity, mechanical strength, and the abrasive properties of the transparent resin. However, the prism sheet 20 of the present invention has better rigidity, mechanical strength, and abrasive properties. Therefore, the present prism sheet is not easily damaged or scratched.

It should be noted that, if the second micro-depressions 204 intersect with the first micro-depression 203, or the second micro-depressions 204 are aligned obliquely with the LCD pixels either in the X-direction or the Y-direction, moiré pattern interference effect caused by the prism sheet 20 and the pixel pitch of the liquid crystal display panel is kept minimal or eliminated.

Figure 4:
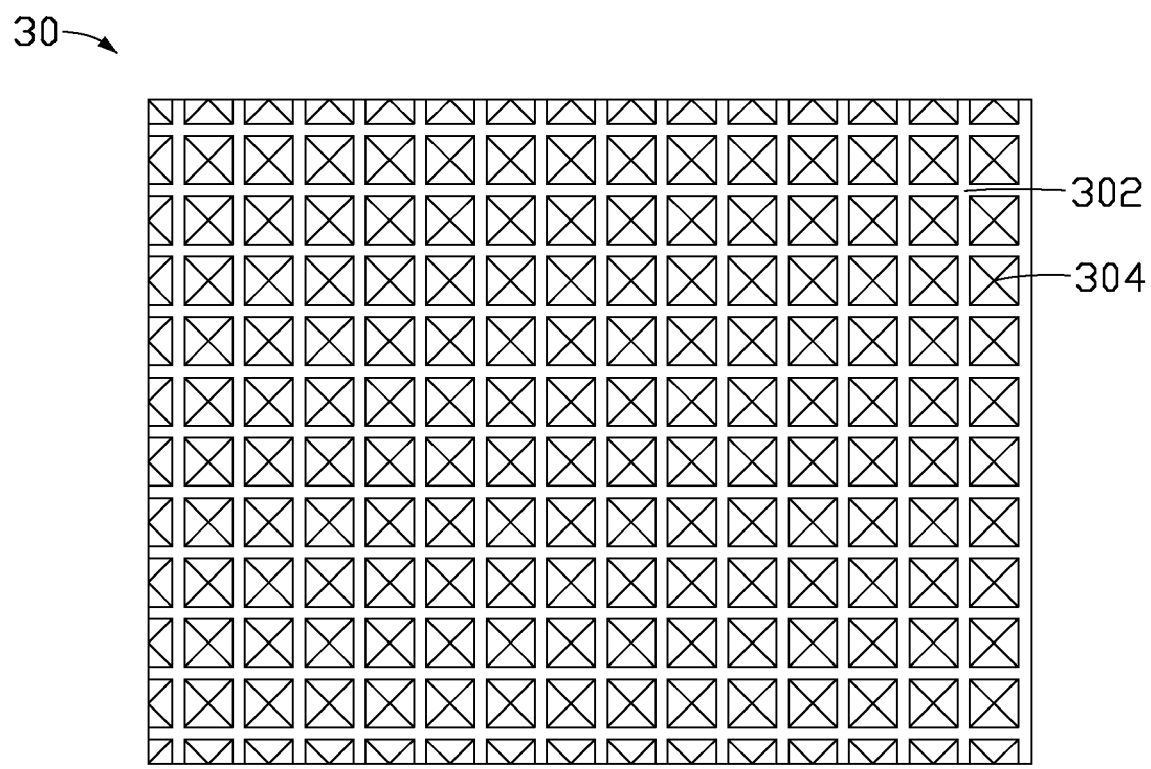
FIG. 4 is a top plan view of a prism sheet according to a second preferred embodiment of the present invention.

Referring to FIG. 4, a prism sheet 30 in accordance with a second preferred embodiment of the present invention is shown. The prism sheet 30 is similar in principle to the prism sheet 20. However, first micro-depressions 304 are aligned apart on second surface 302 of the prism sheet 30 in a matrix arrangement.

Figure 5:
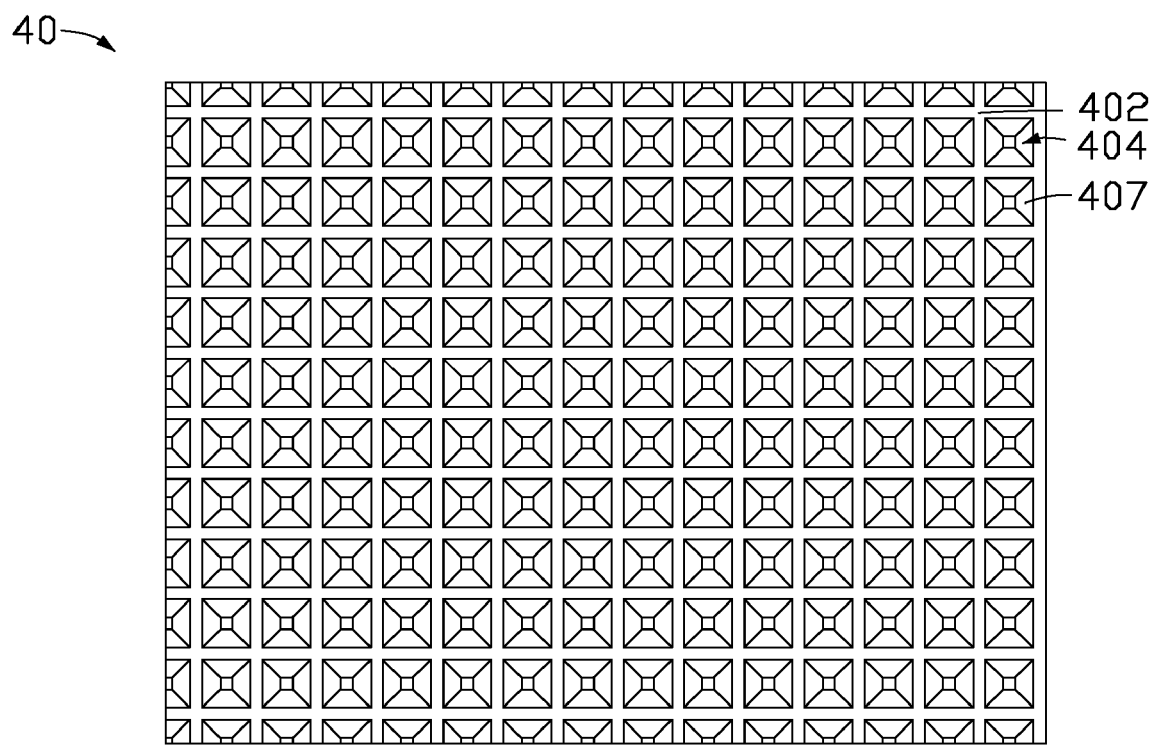
FIG. 5 is a top plan view of a prism sheet according to a third preferred embodiment of the present invention.

Referring to FIG. 5, a prism sheet 40 in accordance with a third preferred embodiment of the present invention is shown. The prism sheet 40 is similar in principle to the prism sheet 30, except that each second micro-depression 404 of second surface 402 is a frusto-pyramidal depression, and includes four inner sidewalls 407. Each of the inner sidewalls 407 of the second micro-depressions 404 is an isosceles trapezium.

Figure 6:
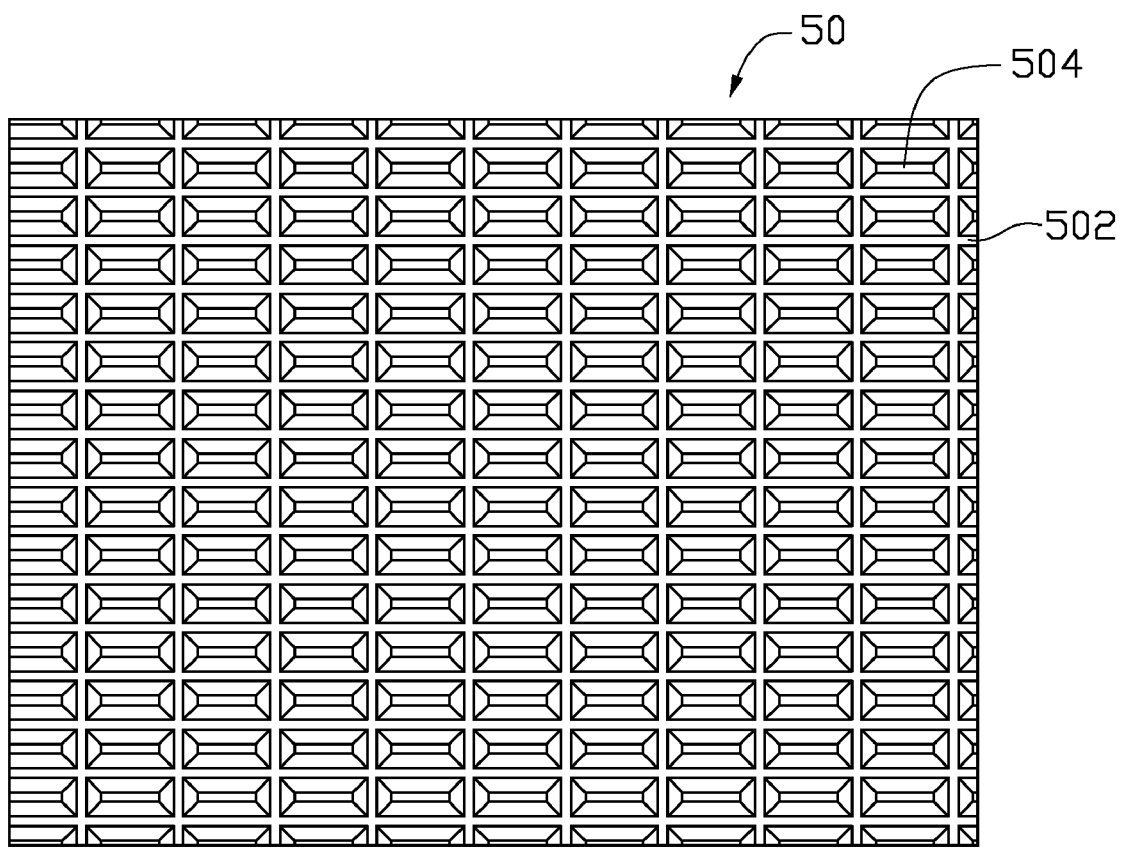
FIG. 6 is a top plan view of a prism sheet according to a fourth preferred embodiment of the present invention.
Figure 7:
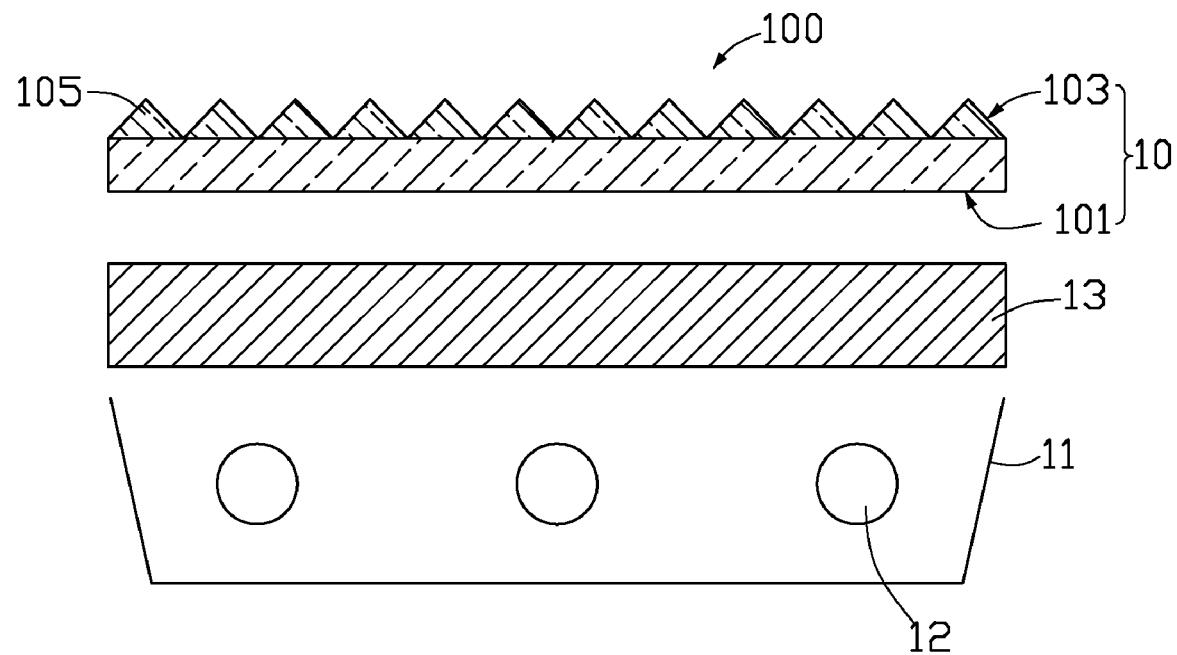
FIG. 7 is a side cross-sectional view of a conventional backlight module employing a typical prism sheet.
Figure 8:
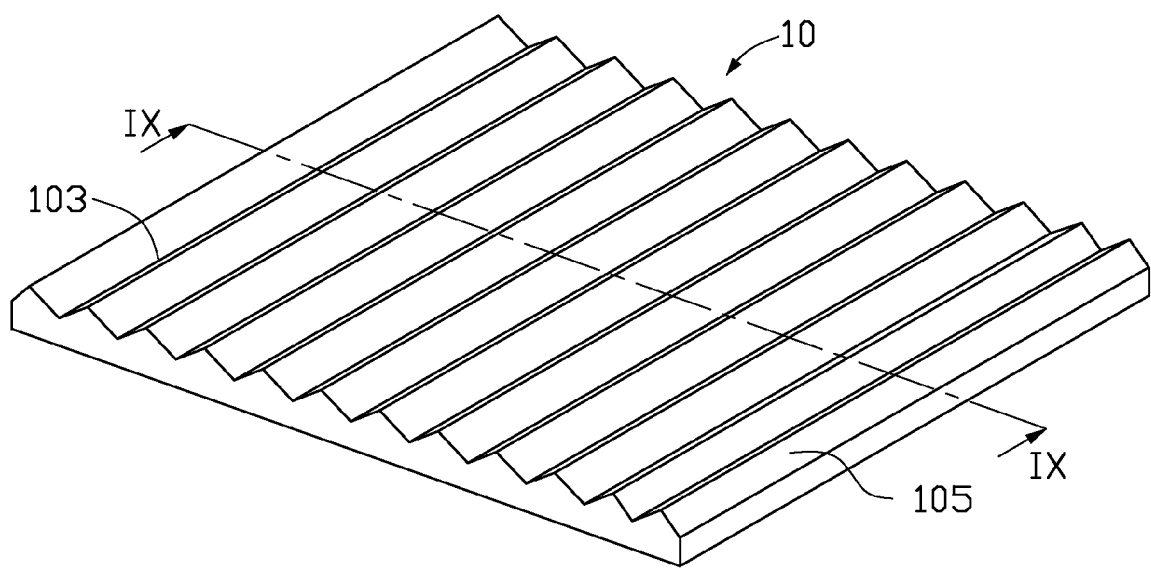
FIG. 8 is an isometric view of the prism sheet shown in FIG. 7.
Figure 9:
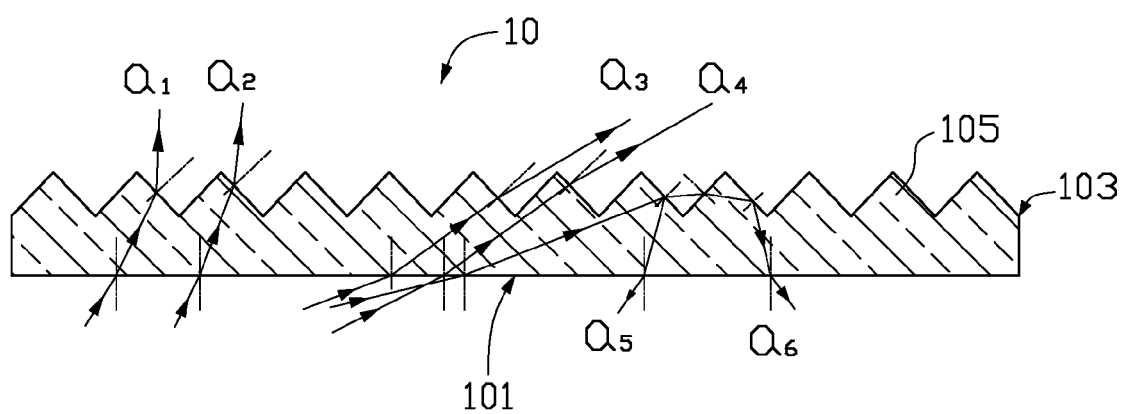
FIG. 9 is side, cross-sectional view of the prism sheet of FIG. 8, taken along line IX-IX, showing light transmission paths.

Referring to FIG. 6, a prism sheet 50 according to a fourth embodiment is shown. The prism sheet 50 is similar in principle to the prism sheet 30, except that each of micro-depressions 504 of a second surface 502 is a polyhedron depression that includes four inner connecting sidewalls. A first pair of opposite inner sidewalls of the four inner sidewalls is isosceles triangles with planar surfaces parallel to an X-axis. A second pair of opposite inner sidewalls of the four inner sidewalls is isosceles trapeziums with planar surfaces parallel to a Y-axis.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A prism sheet comprising:
    a transparent main body having:
    a first surface,
    a second surface opposite to the first surface,
    a plurality of first micro-depressions formed in the first surface and a plurality of second micro-depressions formed in the second surface, wherein the first micro-depressions cooperatively define a plurality of first waved ridges extending along a first direction and a plurality of second waved ridges extending along a second direction substantially perpendicularly intersecting with the first direction; an outline of a cross-section of each micro-depression taken along a plane perpendicular to the first waved ridges is a sinusoidal curve; an outline of a cross-section of each micro-depression taken along a plane perpendicular to the second waved ridges is a sinusoidal curve; each of the second micro-depressions is defined by four connecting inner sidewalls; a transverse width of each inner sidewall progressively decreases with increasing distance from the second surface.

2. The prism sheet according to claim 1, wherein a pitch of the adjacent first micro-depressions is configured to be in a range from about 0.025 millimeters to about 1.5 millimeters.

3. The prism sheet according to claim 1, wherein the second micro-depressions are selected from a group consisting of rectangular pyramidal depression and frusto-pyramidal depression.

4. The prism sheet according to claim 1, wherein a dihedral angle defined between two opposite sidewalls of each second micro-depression is configured to be in a range from about 60 degrees to about 120 degrees.

5. The prism sheet according to claim 1, wherein a pitch of the adjacent second micro-depressions is configured to be in a range from about 0.025 millimeters to about 1 millimeter.

6. The prism sheet according to claim 1, wherein a thickness of the prism sheet is in a range from about 0.5 millimeters to about 3 millimeters.

7. The prism sheet according to claim 1, wherein the second micro-depressions are distributed on the second surface in a matrix manner.

8. The prism sheet according to claim 7, wherein rows or columns of the second micro-depressions are parallel or slanted to the edges of the prism sheet.

9. The prism sheet according to claim 1, wherein the second micro-depressions are aligned apart on the second surface.

10. The prism sheet according to claim 1, wherein the prism sheet is made of transparent material selected from the group consisting of polycarbonate, polymethyl methacrylate, polystyrene, copolymer of methylmethacrylate and styrene, and any combination thereof.

11. A backlight module comprising:
    a plurality of lamps;
    a light diffusion plate disposed above the lamps; and
    a prism sheet disposed on the light diffusion plate, the prism sheet includes a transparent main body having
    a first surface,
    a second surface opposite to the first surface,
    a plurality of first micro-depressions formed in the first surface and a plurality of second micro-depressions formed in the second surface, wherein the first micro-depressions cooperatively define a plurality of first waved ridges extending along a first direction and a plurality of second waved ridges extending along a second direction substantially perpendicularly intersecting with the first direction; an outline of a cross-section of each micro-depression taken along a plane perpendicular to the first waved ridges is a sinusoidal curve; an outline of a cross-section of each micro-depression taken along a plane perpendicular to the second waved ridges is a sinusoidal curve; each of the second micro-depressions is defined by four connecting inner sidewalls; a transverse width of each inner sidewall progressively decreases with increasing distance from the second surface.

12. The backlight module according to claim 11, wherein the second micro-depressions are selected from a group consisting of rectangular pyramidal depression and frusto-pyramidal depression.

13. The backlight module according to claim 11, wherein a dihedral angle defined between two opposite sidewalls of each second micro-depression is configured to be in a range from about 60 degrees to about 120 degrees.

14. The backlight module according to claim 11, wherein a thickness of the prism sheet is in a range from about 0.5 millimeters to about 3 millimeters.

15. The backlight module according to claim 11, wherein the second micro-depressions are distributed on the first surface in a matrix manner.

16. The backlight module according to claim 15, wherein rows or columns of the second micro-depressions are parallel or slanted to the edges of the prism sheet.

17. The backlight module according to claim 11, wherein the second micro-depressions are aligned apart on the second surface.

18. The backlight module according to claim 11, wherein the second micro-depressions are aligned side by side on the second surface.

* * * * *